July 2, 1929.  G. W. SMIDLEY  1,719,245
HOG FEEDER
Filed Aug. 27, 1927   2 Sheets-Sheet 2
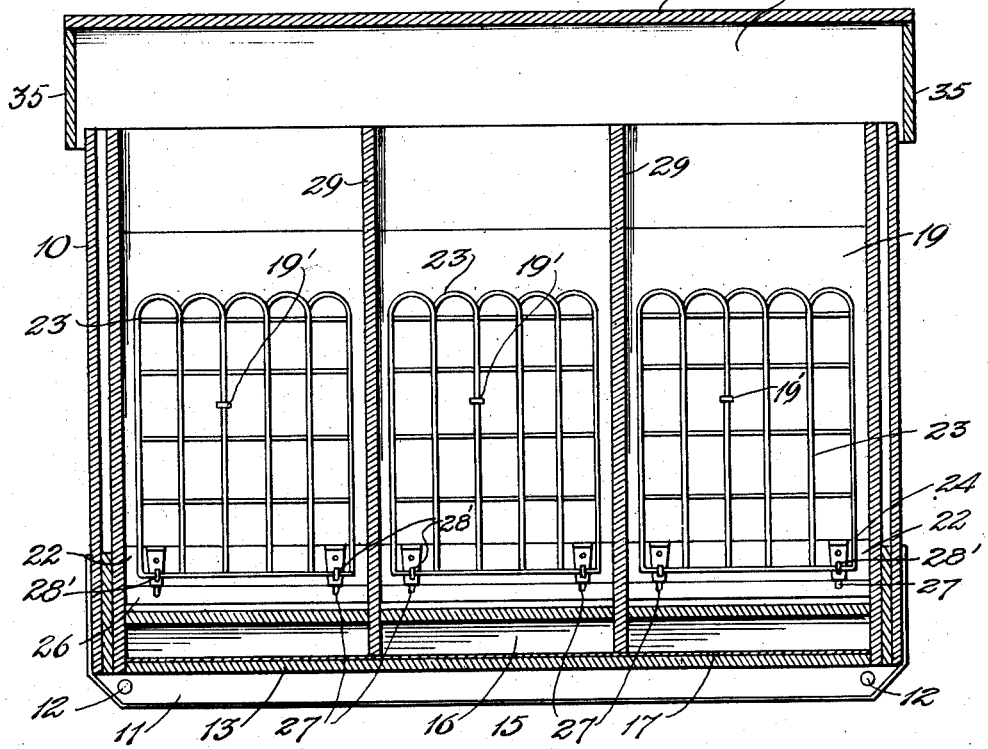
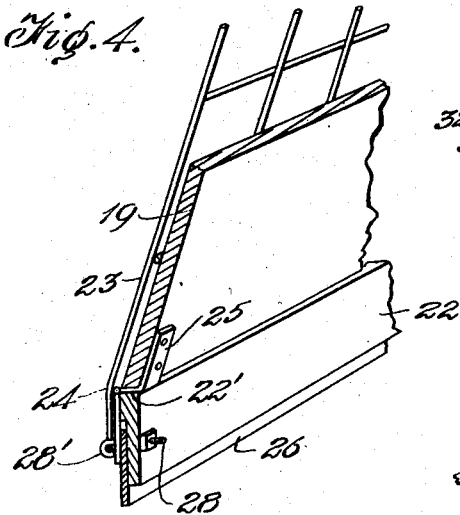
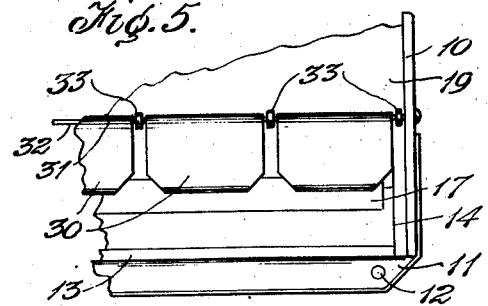
INVENTOR.
George W. Smidley,
BY
ATTORNEYS.

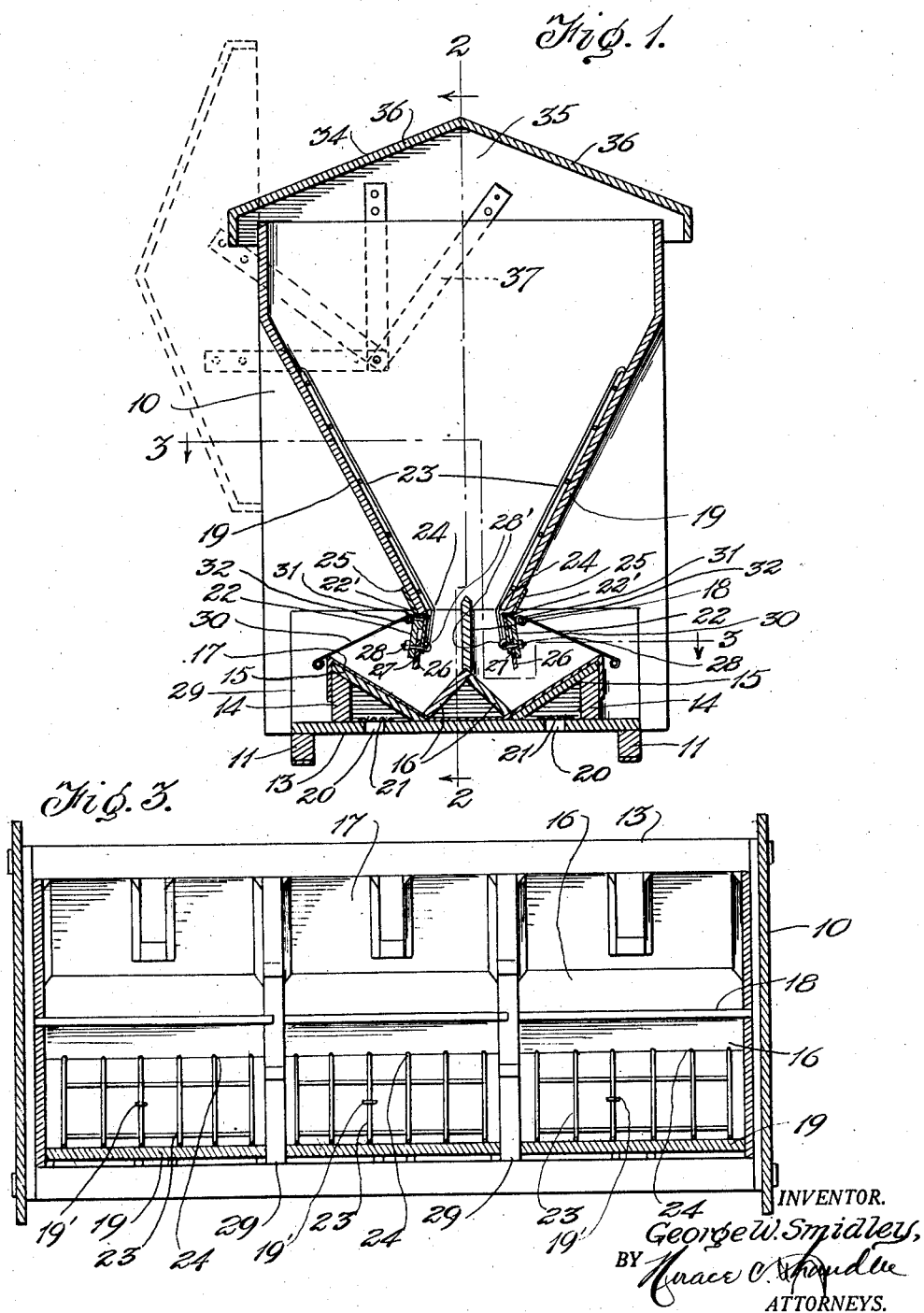

Patented July 2, 1929.

1,719,245

UNITED STATES PATENT OFFICE.

GEORGE W. SMIDLEY, OF NEW HOLLAND, OHIO.

HOG FEEDER.

Application filed August 27, 1927. Serial No. 215,909.

This invention relates to new and useful improvements in feeding devices, and particularly to devices for feeding hogs, and the like.

One object of the present invention is to provide a feeder having a trough so formed that the hogs may more easily reach the feed, and eat more naturally than with similar devices heretofore. The formation of the mouth and head of a hog precludes eating over a barrier, at the front edge of a trough, it being well known that the hog attempts to eat longitudinally of the trough. It is therefore the principal object of the invention to provide a trough which obviates this front barrier, whereby a smooth and unobstructed surface is presented.

Another object is to provide a feeder of this character which is so constructed that the hog cannot get any more than a limited amount of feed before him, at one time, thereby preventing the rendering of the feed soggy, and ultimately sour, which condition is offensive to other hogs, as the hogs desire clean feed.

Another object is to provide means for regulating the flow of the feed from the hopper, into the trough, so that a new portion of feed cannot be delivered into the trough until the hog has consumed that which is before him.

Another object is to provide an agitator, located within the hopper of the feeding device, in such a manner that the feed is prevented from caking on the inclined sides of such hopper, said agitator being operable by the nose of the hog.

Another object is to provide a movable barrier, so arranged that the hog may move same with its nose, to cause the movement of the agitator, with the resultant flow of feed from the hopper, into the feeding trough.

Another object is to provide a feed checking barrier which is so mounted that the feed, from the hopper, cannot collect thereon, and which is operatively connected with the agitator, so that operation is assured at all times, such means for operating the agitator being an improvement over my prior Patent #1,417,212, patented May 23, 1922.

Another object is to provide a novel and simple, as well as cheap means for mounting the individual doors for the feeding compartments of the trough.

In the drawings:

Figure 1 is a vertical transverse sectional view through the feeder, the lid being shown in closed position, and the open position indicated by dotted lines.

Figure 2 is a vertical longitudinal sectional view on the line 2—2 of Figure 1.

Figure 3 is a horizontal sectional view on the line 3—3 of Figure 1.

Figure 4 is an enlarged detail perspective view of a portion of the agitator and swinging door, together with a portion of the side wall of the hopper.

Fig. 5 is a fragmentary front elevation of the lower portion of the device.

Fig. 6 is an enlarged vertical sectional view of the structure shown in Fig. 5.

Referring particularly to the accompanying drawings, 10 represents a housing which is supported on the runners 11, and which runners are provided with openings 12 for the reception of draft means, whereby to permit moving the device from place to place. Mounted on the upper face of the bottom 13, of the housing, and extending longitudinally thereof, are the beams 14, and secured to the upper beveled edge of each beam, and inclining downwardly and inwardly therefrom, is one bottom member 15, of the feeding troughs, the other bottom members 16 extending upwardly and inwardly from the lower edges of the members 15, and being connected at their upper edges to form an inverted V-shaped partition extending throughout the length of the housing 10, and centrally thereof. A sheet of metal 17 covers the upper faces of the members 15, and extends beneath the members 16, the longer marginal edges of such metal sheet being turned downwardly, and being secured to the outer faces of the beams 14. Projecting upwardly from the apex of the partition, formed by the members 16, is the longitudinally extending wall 18, which prevents air blowing transversely through the feeder, when hogs are feeding at both sides of the feeder at the same time, thereby obviating loss of feed. Inclining downwardly and inwardly from the upper portion of the interior of the housing are the longitudinally extending side walls 19 of the hopper of the feeder, the lower end of said hopper being disposed to discharge into both of the feeding troughs at the same time. Formed in the bottom of the housing, beneath the bottom members 15, and inwardly of the beams 14, are the ventilating openings 20, each being covered with screen 21.

Extending longitudinally of the lower edge of each of the walls 19, and being hinged thereto, is a door or barrier 22, and loosely connected to the lower portion of the inner face of said door is the lower end of the agitator 23. This agitator is preferably formed from wire, in the form of a large open mesh screen, and is held against the inner face of the inclined wall 19 by any suitable means, as at 19', the lower end of the screen being bent at an obtuse angle, as at 24, where it is connected with the door 22, as before mentioned. The upper leaf 25, of each of the hinges of the door 22, is bent at an angle, as shown at 22', and such leaf is secured to the outer face of the inclined wall 19, whereby the door has a normal tendency to swing outwardly, and depend at a slight angle with respect to a vertical plane. It will be noted that each door or barrier 22 depends over the approximate center of a trough and is adapted to be moved inwardly by the nose of the feeding hog, with the result that the agitator will be moved up and down, on the wall of the hopper, whereby to maintain the feed in a loose condition, and prevent caking thereof. This causes a downward flow of feed, from the hopper, in a thin sheet, which escapes forwardly beneath the lower edge of the barrier, in position to be eaten by the hog. The mass of feed at the other side of the barrier or door normally holds the door against being pushed inwardly, but when the feed, outwardly of the door has been consumed the mass will be loosened to a sufficient degree to permit the feed to fall, and replace that which has been eaten, thereby allowing the hog to press the door inwardly, with its nose, thereby actuating the agitator, to permit more feed to fall, and again hold the door against being pushed inwardly. Thus the hog is permitted a limited amount of feed at one time, with the result that he will consume the entire amount before him, and not spoil the feed with saliva. Furthermore, the particular inclination of the front wall portion of the trough, and the absence of any barrier or wall, at the forward edge of such trough, permits the hog to feed in a natural position. The fact that the door or barrier 22 hangs at an outward inclination, places the door out of the line of the flow of feed from the hopper, and thereby prevents collection of feed thereon, and at the same time affords a more easy operation of such barrier. Mounted on each door or barrier 22, and extending the entire length thereof, is a metal plate 26, which is provided with the slots 27, receiving the bolts 28, which permit the vertical adjustment of such plate, whereby to regulate the flow of feed beneath the door, from the hopper into the trough. The inner end of each of said bolts 28 is formed with a loop 28', in which is loosely disposed the lowermost of the transverse wires of the agitator, whereby said agitator is properly connected with the door for agitating the feed, as said door is moved. Each trough is divided into a plurality of compartments by means of the vertical transverse partitions 29. A gravity actuated cover or lid 30, preferably formed from sheet metal, is disposed over each of the compartments of the troughs, the inner end of each lid being rolled into tubular form, as at 31, to receive a pintle rod 32, which extends throughout the entire length of the housing, and has its ends journaled in the end walls thereof. A cotter pin, or split key 33 has its legs disposed through an opening in the wall 19, adjacent the lower edge thereof, and such legs bent over a washer 33', the eye of the pin receiving the pintle rod 32 therethrough. It will be noted that there is a pin 33 between each adjacent pair of lids 30, whereby the pintle is properly supported throughout its length, and whereby the said lids are held in proper spaced relation, thus obviating any tendency of the lids to contact with each other, which might cause two adjacent lids to be raised, upon the hog nosing one of them upwardly. The forward or free ends of the lids are rolled to obviate any sharp edges being presented to the noses of the feeding hogs. The forward corners of the lids 30 are, however, cut off obliquely, whereby to prevent the hog raising two adjacent lids at the same time.

Disposed on the upper portion of the housing 10 is the roof or cover 34, which has the triangular end 35, and the upwardly and inwardly sloping top members 36. The end members depend outwardly of the end walls of the housing, and are spaced a short distance outwardly thereof. A triangular metal member 37 has its apex pivotally connected to one end wall of the housing and the wider end bolted to the inner face of the triangular end wall of the roof, said member 37 being duplicated at the other end of the housing and roof and being arranged adjacent one of the wider sides of said housing, whereby to support said roof at such side, the other longer side of the roof being supported on the other longer upper edge of the housing. The closed position of the roof, or when it is lowered, is shown in full lines in Figure 1, while the open position is shown in dotted lines in said figure. It will be noted that the greater portion of the roof is arranged at one side of the pivots of the hinges whereby the weight of this portion of the roof will normally maintain the roof in closed position against accidental opening, especially by high winds. It will be further noted that, when the roof is in open position it stands in a vertical plane against one of the longer sides of the housing, thus permitting easy access to the interior of the hopper, and replenishing of the feed from either end of the housing or from the front thereof. This is also advantageous when it is desired to clean the interior of the hopper.

What is claimed is:

1. A feeder including a hopper having an outwardly and upwardly inclined front wall, a feeding compartment beneath the hopper and receiving therefrom, an open mesh agitating member reciprocably mounted on the said wall, within the hopper, and a pendent barrier supported on said wall in a normal downward and outward inclined position and operatively connected with the agitating member, said barrier being normally urged downwardly and outwardly by said agitator, said barrier being adapted to be moved inwardly by the nose of a feeding hog, whereby to cause the upward movement of the agitator.

2. A feeder including a hopper having an upwardly and outwardly inclined wall and a feeding compartment therebelow and receiving from said hopper, an agitator member slidably mounted on the said wall, within the hopper, to maintain the feed from caking on said wall, and a downwardly and outwardly inclined barrier suspended on the lower end of said hopper wall within the feeding compartment for free movement therewithin, said barrier being operable in one direction by a hog for moving said agitator member in one direction, and movable in the opposite direction by said agitator.

3. A feeder including a hopper having inclined walls, a feeding compartment beneath the hopper and receiving therefrom, the hopper having an inclined front wall, a movable barrier depending from the said wall into said compartment and serving to regulate the flow of feed from the hopper to the compartment, and an agitator mounted on the barrier and movable upwardly and downwardly on the said inclined wall, said barrier being adapted to be moved in one direction by the nose of a hog to operate the agitator upwardly, and to be moved into downwardly and outwardly inclined position by the weight of the agitator.

In testimony whereof, I affix my signature.

GEORGE W. SMIDLEY.